United States Patent
Shi et al.

(10) Patent No.: US 8,817,821 B2
(45) Date of Patent: Aug. 26, 2014

(54) METHOD AND DEVICE FOR USER DATAGRAM PROTOCOL PACKET COMPRESSION AND DECOMPRESSION

(75) Inventors: Xuehong Shi, Shenzhen (CN); Jian Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 188 days.

(21) Appl. No.: 13/499,471

(22) PCT Filed: Apr. 23, 2010

(86) PCT No.: PCT/CN2010/072140
§ 371 (c)(1),
(2), (4) Date: Mar. 30, 2012

(87) PCT Pub. No.: WO2010/148759
PCT Pub. Date: Dec. 29, 2010

(65) Prior Publication Data
US 2012/0177064 A1   Jul. 12, 2012

(30) Foreign Application Priority Data

Nov. 27, 2009   (CN) .......................... 2009 1 0250405

(51) Int. Cl.
*H04J 3/18*   (2006.01)
*H04L 29/06*   (2006.01)

(52) U.S. Cl.
CPC .............. *H04L 69/04* (2013.01); *H04L 69/164* (2013.01); *H04L 69/16* (2013.01)
USPC ...................................................... 370/477

(58) Field of Classification Search
CPC .................... H04L 29/0604; H04L 2012/5667; H04L 49/606; H04L 69/04; H04L 69/16; H04L 69/164; H04W 28/06
USPC .............................. 370/395.52, 466, 471–477
See application file for complete search history.

(56) References Cited

U.S. PATENT DOCUMENTS

| 8,009,699 | B2 | 8/2011 | Zhang | |
| 2002/0191614 | A1* | 12/2002 | Ido et al. | 370/394 |
| 2006/0120352 | A1* | 6/2006 | Agashe et al. | 370/352 |
| 2007/0025387 | A1* | 2/2007 | Zhang | 370/447 |
| 2007/0058679 | A1 | 3/2007 | Pelletier et al. | |
| 2007/0098016 | A1 | 5/2007 | Kapoor et al. | |

FOREIGN PATENT DOCUMENTS

| CN | 101204068 A | 6/2008 |
| WO | 2006137803 | 12/2006 |
| WO | 2007008750 | 1/2007 |
| WO | 2009003061 A1 | 12/2008 |

OTHER PUBLICATIONS

International Search Report for PCT/CN2010/072140, English translation attached to original, Both completed by the Chinese Patent Office on Jul. 25, 2010, All together 6 Pages.
Bormann et al. "RObust Header Compression (ROHC): Framework and four profiles: RTP, UDP, ESP, and uncompressed", Request for Comments: 3095, Jul. 2001, All together 182 Pages.
Extended European Search Report for EP 10791265.1, Dated Oct. 15, 2013, 5 Pages.

* cited by examiner

*Primary Examiner* — Jae Y Lee
*Assistant Examiner* — Jean F Voltaire
(74) *Attorney, Agent, or Firm* — Brooks Kushman P.C.

(57) ABSTRACT

A method for compressing a user datagram protocol (UDP) data packet includes: when receiving an Internet Protocol version 4 (IPv4) UDP data packet, a compressor searching a context of the UDP data packet, if the context does not exist, creating the context of the UDP data packet, taking a value of an IP identifier (IP-ID) field of the UDP data packet as an initial value of a serial number (SN) of the context, and then compressing the UDP data packet according to the context. Also provided are methods and devices for compressing and decompressing a UDP data packet. The methods and devices can effectively improve the compression efficiency, reduce the probability of sending the IR/IRDYN packet, significantly reduce 1 byte transmission, improve the compression efficiency by 50%, and reduce the probability of using an extension header with a high capacity.

14 Claims, 5 Drawing Sheets

| R-1 |||
|---|---|---|
| 1 | 0 | SN |
| X | | IP-ID |

| Extension 1 ||||
|---|---|---|---|
| 0 | 1 | SN | IP-ID |
| IP-ID ||||

| Extension 0 ||||
|---|---|---|---|
| 0 | 0 | SN | IP-ID |

| Extension 2 ||||
|---|---|---|---|
| 1 | 0 | SN | IP-ID2 |
| IP-ID2 ||||
| IP-ID1 ||||

FIG. 1

| R-1 | | | |
|---|---|---|---|
| 1 | 0 | X | IP-ID |

| Extension 0 | | |
|---|---|---|
| 0 | 0 | IP-ID |

| Extension 1 | | |
|---|---|---|
| 0 | 1 | IP-ID |
| IP-ID | | |

| Extension 2 | | |
|---|---|---|
| 1 | 0 | IP-ID2 |
| IP-ID2 | | |
| IP-ID1 | | |

METHOD AND DEVICE FOR USER DATAGRAM PROTOCOL PACKET COMPRESSION AND DECOMPRESSION

CROSS-REFERENCE TO RELATED APPLICATION

This application is the U.S. national phase of PCT Appln. No. PCT/CN2010/072140 filed Apr. 23, 2010 which claims priority to Chinese Application No. 200910250405.X filed on Nov. 27, 2009, the disclosures of which are incorporated in their entirety by reference herein.

TECHNICAL FIELD

The present invention relates to the field of mobile communications, and more especially, to methods and devices for compressing or decompressing a User Datagram Protocol (UDP) packet.

BACKGROUND OF THE RELATED ART

Due to restrictions on the physical conditions, compared with the wired link, the wireless link in the mobile communication system has a lower transmission rate and a relatively higher bit error rate. In order to effectively use the limited wireless channel bandwidth resources, the Robust Header Compression (ROHC) technique is introduced. The core of the ROHC is to use the information redundancy between the service flow packets to transparently compress and decompress the information in the packet header between the directly connected nodes.

Currently, the ROHC supports the compression and decompression of the Internet Protocol (IP)/User Datagram Protocol (UDP)/Real-time Transport Protocol (RTP), the IP/UDP, and the IP/Encapsulation Security Protocol (ESP) data packets. Both the RTP header and the ESP header have the Serial Number (SN) field, and therefore, after both types of packets are compressed, the compressed packets include the serial number information. After the decompressor decompresses the packets, it sends a feedback to the compressor as desired, and an important field for identifying the feedback is the SN. The compressor will performing sliding based on the window of the Window based LSB Encoding (WLSB) method and the window of the translation table according to the SN. In addition, when the decompressor decompresses a packet, a plurality of fields, for example, the IP packet identifier (IP-ID), can be recovered according to the value of the SN in the compressed packet, and these fields are no longer transmitted in the compressed packet, so as to improve the compression efficiency.

It can be seen from the above description that, the SN plays an important role in the entire compression and decompression procedure. However, there is no SN field in the UDP header, but the SN is necessary in the actual compression and decompression, and therefore, the protocol specifies that if it is a UDP packet, the compressor should randomly generate one SN during the initiation, and the SN value of each subsequent packet is incremented by 1, so that a UDP packet has one SN for use in the compression and decompression procedure.

In the case that the Internet Protocol (IP) type is the IP version 4 (IPv4), when the UDP packet is compressed, the R-1 type packet format defined in the protocol can be used, referred to FIG. 1, wherein the R-1 type packet format defined in the protocol has a 6-bit SN field, and each of the extension 0, the extension 1 and the extension 2 contains a 3-bit SN field. The IP header has the IP identifier (IP-ID) field. The difference between the IP-ID field and the SN should be calculated in the compression, the difference value (IP-ID_offset) between the IP-ID and the SN is encoded with the WLSB method, and the encoded value is included in the compressed packet to be transmitted to the decompressor. The decompressor can obtain the original IP-ID by summing the recovered original SN and the Least Significant Bit (LSB) decoded IP-ID_offset. The R-1 type packet format is used in the R mode, and the R mode refers to the bidirectional reliable mode.

The main idea of the Least Significant Bits encoding method is to compare the value V to be encoded and the reference value (the previous value to be encoded) $V_{ref}$, and since the difference of these two values is insignificant, the lower k different bits are taken as the encoded values; during the decoding, the k-bit data are used to replace the lower k bits of the reference value so that the original value V can be recovered.

Considering that the wireless link might loss packets, the reference values used by the compressor and decompressor might be inconsistent, and therefore, the compressor establishes a window and place the used reference into the window, and when it needs to use the LSB encoding, the maximum and minimum values are found out from the window and are respectively LSB encoded, and then the acquired k are compared and the value of the larger k is taken as the final encoding result. Therefore, even if the packet is lost due to the instable link, the decompressor can also recover the original values from the compressed fields with the LSB decoding method, thus increasing the robustness of the compression and decompression. When there is a new value to be added to the window while the window is full, the oldest reference value is discarded; or when the acknowledgement of the decompressor is received, all the reference values before the acknowledged one are all cleared, so that the window is slid forward. This is the window based LSB encoding.

SUMMARY OF THE INVENTION

When the IP version is the IPv4 and the packet type is the UDP, there are the following defects.

1. A randomly generated SN is used during the initiation, which leads to that the difference between the IP-ID and the SN is relatively large, and the probability of generating a larger k value after using the WLSB encoding is increased.

2. The generated SN is incremented by 1 at each subsequent packet compression procedure, and thus there is no need to transmit the compressed SN value in all the compressed packets, which wastes the valuable wireless bandwidth.

The technical problem to be solved in the present invention is to provide methods and devices for compressing or decompressing a user datagram protocol packet, applied in compression and decompression of the packets whose type is the UDP and IP version is the IPv4, thus effectively improving the compression efficiency, reducing the probability of sending the Initiation and Refresh (IR)/Initiation and Refresh-dynamic (IR-DYN) packets.

To solve the aforementioned technical problem, the present invention provides a method for compressing a User Datagram Protocol (UDP) packet, comprising:

when a compressor receives an IPv4 UDP data packet, searching a context of the UDP data packet, and if the context does not exist, creating the context of the UDP data packet, taking a value of an IP identifier (IP-ID) field of the UDP data packet as an initial value of a serial number (SN) in the context, and then compressing the UDP data packet according to the context.

The step of compressing the UDP data packet comprises: if a R-1 compressed packet format is used, and a R-1 compressed packet does not have an extension header, or the R-1 compressed packet includes an extension header 0, an extension header 1 or an extension head 2, not including the SN in the R-1 compressed packet or the extension header of the R-1 compressed packet.

The step of compressing the UDP data packet further comprises:

extending the IP-ID field in the extension header 0, the extension header 1 and the extension header 2, and extending an SN field as a segment of the IP-ID field; and taking the extended IP-ID field to carry information of a difference between an IP-ID value and the SN, and compressing the UDP data packet.

The IP-ID field in the extension header 2 includes a first IP-ED field and a second IP-ID field;

the step of extending the SN field as the segment of the IP-ID field comprises: in the extension header 2, extending a segment of the SN field or the whole SN field as a segment of the first IP-ID field, and extending the left SN field as a segment of the second IP-ID field;

the step of taking the extended IP-ID field to carry the information of the difference between the IP-ID and the SN comprises: taking the extended first IP-ID field to carry information of a difference between a first IP-ID value and the SN, and taking the extended second IP-ID field to carry information of a difference between a second IP-ID value and the SN.

To solve the above technical problem, the present invention further proposes a method for compressing a User Datagram Protocol (UDP) data packet, used to compress an IPv4 UDP data packet, comprising: compressing the UDP data packet with a following method:

if an R-1 compressed packet format is used, and an R-1 compressed packet does not have an extension header, or the R-1 compressed packet includes an extension header 0, an extension header 1 or an extension header 2, not including a serial number (SN) in the R-1 compressed packet or the extension header of the R-1 compressed packet.

The method for compressing the UDP data packet also comprises:

extending an IP-ID field in the extension header 0, the extension header 1, and the extension header 2, and extending an SN field as a segment of the IP-ID field; and taking the extended IP-ID field to carry information of a difference between an IP-ID and the SN.

The IP-ID field in the extension header 2 includes a first IP-ID field and a second IP-ID field;

the step of extending the SN field as the segment of the IP-ID field comprises: when extending the IP-ID field in the extension header 2, extending a segment of the SN field or the whole SN field as a segment of the first IP-ID field, and extending the left SN field as a segment of the second IP-ID field;

the step of taking the extended IP-ID field to carry the information of the difference between the IP-ID value and the segment SN comprises: taking the extended first IP-ID field to carry information of a difference between a first IP-ID value and the SN, and taking the extended second IP-ID field to carry information of a difference between a second IP-ID value and the SN.

To solve the above technical problem, the present invention further proposes a method for decompressing a User Datagram Protocol (UDP) data packet, used to decompress an IPv4 UDP data compressed packet, comprising:

receiving a UDP compressed packet to be decompressed, if the compressed packet does not have an extension header, or includes the extension header 0, the extension header 1 or the extension header 2, and the compressed packet is compressed with the method claimed in any one of claims 2 to 7, incrementing a serial number (SN) of a previous compressed packet of the UDP compressed packet in a same packet flow by 1 and then take the SN as an SN of the compressed packet, decompressing an IP-ID field of the compressed packet to acquire information of a difference between an IP-ID and the SN, and summing the information of the difference and the SN to acquire an original IP-ID value, thereby restoring an original UDP data packet.

The step of decompressing the IP-ID field of said compressed packet comprises: decompressing the IP-ID field in the extension header 0, the extension header 1 and the extension header 2; wherein, the IP-ID field in the extension header 0, the extension header 1 and the extension header 2 is the extended IP-ID field, and the extended IP-ID field includes: the IP-ID field and an SN field which is extended as a segment of the IP-ID field.

In the extension header 2, the extended IP-ID field includes an extended first IP-ID field and an extended second IP-ID field; wherein, the extended first IP-ID field includes a first IP-ID field and the SN field which is extended as a segment of the first IP-ID field; and the extended second IP-ID field includes a second IP-ID field and the SN field which is extended as a segment of the second IP-ID field.

To solve the above technical problem, the present invention further proposes a device for compressing a User Datagram Protocol (UDP) data packet, comprising a compression processing module, a context creation module, and a storage module, wherein the device is used to compress an IPv4 UDP data packet, wherein:

the compression processing module is configured to: search a context of the UDP data packet in the storage module after receiving the IPv4 UDP data packet, if the context does not exist, instruct the context creation module to create the context of the UDP data packet, and compress the UDP data packet according to the context;

the context creation module is configured to: receive an instruction from said compression processing module, then take a value of an IP identifier (IP-ID) field of the UDP data packet as an initial value of a serial number (SN) in the context, create the context of the UDP data packet and send the context of the UDP data packet to said storage module;

said storage module is configured to: store the context of the UDP data packet.

The compression processing module is configured to compress the UDP data packet as follows: if a R-1 compressed packet format is used, and the R-1 compressed packet does not have an extension header, or the R-1 compressed packet includes an extension header 0, an extension header 1 or an extension header 2, not including an SN in the R-1 compressed packet or the extension header of the R-1 compressed packet.

Said compression processing module is also configured to compress the UDP data packet as follows: extending an SN field in the extension header 0, the extension header 1 and the extension header 2 as a segment of the IP-ID field, and taking the extended IP-ID field to carry information of a difference between an IP-ID and the SN, and compressing the UDP data packet.

The IP-ID field in the extension header 2 includes a first IP-ID field and a second IP-ID field;

the compression processing module is configured to extend the SN field as the segment of the IP-ID field as follows: extending a segment of the SN field or the whole SN field in the extension header 2 as a segment of the first IP-ID field, and extending the left SN field as a segment of the second IP-ID field; and the compression processing module is configured to take the extended IP-ID field to carry the information of the difference between the IP-ID and the SN as follows: taking the extended first IP-ID field to carry information of a difference between a first IP-ID and the SN, and taking the extended second IP-ID field to carry information of a difference between a second IP-ID and the SN.

To solve the above technical problem, the present invention further proposes a device for compressing a User Datagram Protocol (UDP) data packet, used to compress an IPv4 UDP data packet, and the device being configured to:

compress a UDP data packet according to a context as follows: if a R-1 compressed packet format is used, and a R-1 compressed packet does not have an extension header, or the R-1 compressed packet includes an extension header 0, an extension header 1 or an extension header 2, not including a serial number (SN) in the R-1 compressed packet or the extension header of the R-1 compressed packet.

The device is also configured to compress the UDP data packet as follows: extending an SN field in the extension header 0, the extension header 1 and the extension header 2 as a segment of an IP-ID field, and taking the extended IP-ID field to carry information of a difference between an IP-ID and the SN.

The IP-ID field in the extension header 2 includes a first IP-ID field and a second IP-ID field;

said device is configured to extend the SN field as the segment of the IP-ID field as follows: extending a segment of the SN field or the whole SN field in the extension header 2 as a segment of the first IP-ID field, and extending the left SN field as a segment of the second IP-ID field;

the device is configured to take the extended IP-ID field to carry the information of the difference between the IP-ID and the SN as follows: taking the extended first IP-ID field to carry information of a difference between a first IP-ID and the SN, and taking the extended second IP-ID field to carry information of a difference between a second IP-ID and the SN.

To solve the above technical problem, the present invention further provides a device for decompressing a User Datagram Protocol (UDP) data packet, comprising a storage module and a decompression processing module, wherein the device is used to decompress an IPv4 UDP compressed packet, wherein:

said decompression processing module is configured to: receive a UDP compressed packet to be decompressed, if the compressed packet does not have an extension header, or includes an extension header 0, an extension header 1 or an extension header 2, and is compressed with the method claimed in any one of claims 2 to 7, search an SN of a previous compressed packet of this compressed packet in a same packet flow in the storage module, and increment the searched SN by 1 then take the SN as an SN of this compressed packet; and decompress an IP-ID field of the compressed packet to acquire information of a difference between an IP-ID and the SN, and sum the information of the difference and the SN to get an original IP-ID value, thus to restore an original UDP data packet; and the storage module is configured to: store the SN of the decompressed UDP data packet.

Said decompression processing module is configured to decompress the IP-ID field as follows: decompressing the IP-ID field in the extension header 0, the extension header 1 or the extension field 2; wherein, the IP-ID field is the extended IP-ID field;

the extended IP-ID field includes: the IP-ID field and a SN field which is extended as a segment of the IP-ID field.

In the extension header 2, the extended IP-ID field include an extended first IP-ID field and an extended second IP-ID field; the extended first IP-ID field includes a first IP-ID field and an SN field which is extended as a segment of the first IP-ID field; and the extended second IP-ID field includes a second IP-ID field and an SN field which is extended as a segment of the second IP-ID field.

The present invention provides methods and devices for compressing or decompressing a user datagram protocol packet, applied in compression and decompression of a data packet whose IP version is IPv4 and the type is the UDP, and the methods and devices have the following advantages.

1. The compression efficiency can be effectively improved, thus reducing the probability of sending the IR/IRDYN packets.

2. The transmission can evidently reduce 1 byte when using the R-1 type compressed packet, thus improving the compression efficiency by 50%.

3. When the R-1 type compressed packet is used and the extension hander is included, the probability of using the extension header with a large capacity is reduced.

4. After the new SN generation method is introduced in the IP-ID encoding, the efficiency is improved, and the chance of the IP-ID-offset flipping in the life time of the packet flow can be greatly reduced.

BRIEF DESCRIPTION OF DRAWINGS

FIG. 1 is a structural diagram of the packet formats of the R-1 type used by the UDP packet, the extension header 0, the extension header 1 and the extension header 2 specified in the protocol;

PREFERRED EMBODIMENTS OF THE PRESENT INVENTION

The implementation scheme of the present invention will be introduced in detail in the following with combination of the accompanying drawings.

Figure 2:
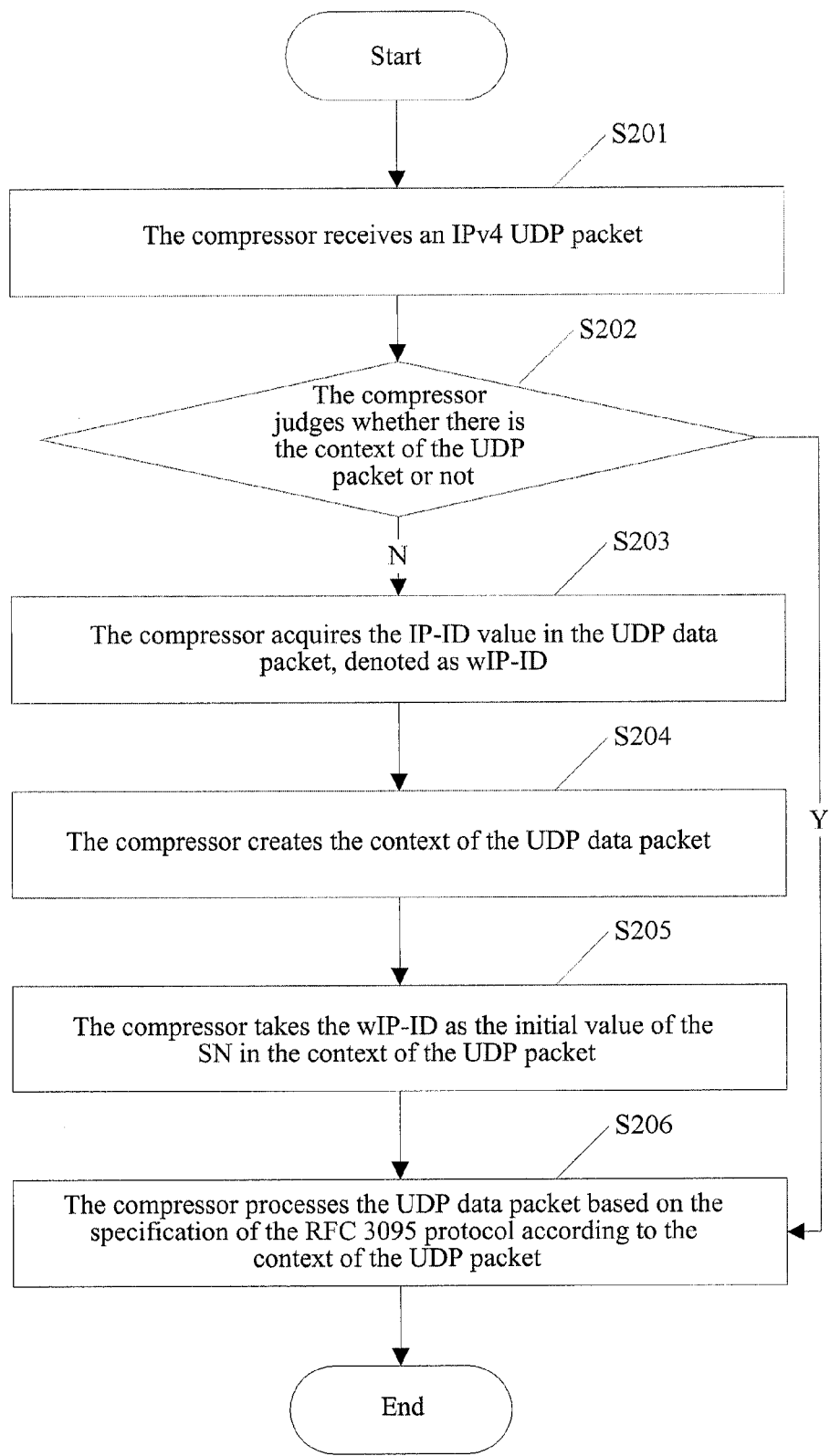
FIG. 2 is a flow chart of a method for compressing the UDP packet whose IP version is the IPv4 in accordance with an embodiment of the present invention.

Refer to FIG. 2, which shows a method for compressing an IPv4 UDP data packet in accordance with an embodiment of the present invention, and the method specifically comprises the following steps.

In step S201, the compressor receives an IPv4 UDP data packet.

In step S202, the compressor judges whether there is the context of the UDP data packet or not, and if yes, step S206 is performed; otherwise, step S203 is performed.

The context is the basis of compressing the data packet and includes information such as the source IP address, the destination IP address, the source port, the destination port, the IP version, and so on. Each packet flow corresponds to one context, and each packet flow comprises a plurality of packets.

In step S203, the compressor acquires the IP-ID value in the UDP data packet, denoted as wIP-ID.

In step S204, the compressor creates the context of the UDP packet.

In step S205, the compressor takes the wIP-ID as the initial value of the SN in the context of the UDP data packet.

In step S206, the compressor processes the UDP data packet based on the specification of the RFC 3095 protocol according to the context of the UDP packet, ending.

The method for compressing the IPv4 UDP data packets in accordance with the embodiment of the present invention skillfully provides the scheme of taking the value of the IP identifier (IP-ID) field of the first UDP packet in the UDP packet flow as the initial value of the SN in the compressed context in the UDP packet flow, to ensure that when the IPv4 UDP data packet is compressed, the difference value IP-ID_offset between the IP-ID field value and the SN might can start from 0, which maximally delays the time when the IP-ID_offset flips, effectively reduces the probability of generating a relatively large WLSB encoded k value, and improves the compression efficiency.

When the compressor processes the UDP data packet based on the specification of the RFC 3095 protocol according to the context of the UDP packet, different compression methods can be chosen as desired. To further reduce the compressed data, to improve the compression efficiency and to save the transmission bandwidth, the embodiment of the present invention also provides a compression method with respect to the IPv4 UDP data packet compression, comprising: when compressing the UDP data according to the context, if the R-1 compressed packet format is used, and the R-1 compressed packet does not have an extension header or includes the extension header 0, the extension header 1, or the extension header 2, the R-1 compressed packet or its extension headers not including the SN, thus effectively reducing the compressed data amount, improving the compression efficiency, and saving the wireless bandwidth.

Furthermore, the aforementioned compression method might also comprise: extending the IP-ID field in the extension header 0, the extension header 1, and the extension header 2, extending the SN field as a segment of the IP-ID field, and when compressing the UDP data, taking the extended IP-ID field to carry the information of the difference between the IP-ID and the SN for compression. The IP-ID field in the extension header 2 includes the first IP-ID field and the second IP-ID field, and in the extension header 2, the present invention can flexibly extend a segment of the SN field or the whole SN field as a segment of the first IP-ID field as desired, and extend the left SN field as a segment of the second IP-ID field. When the UDP data is compressed, the extended first IP-ID field is taken to carry the information of the difference between the first IP-ID and the SN, and the extended second IP-ID field is taken to carry the information of the difference between the second IP-ID and the SN, for compression. At the same time when not compressing the SN, the present invention fully uses the space of the SN field, and skillfully extends the SN field as a segment of the IP-ID field, which effectively increases the information amount carried by the IP-ID field.

Figures 3, 4:
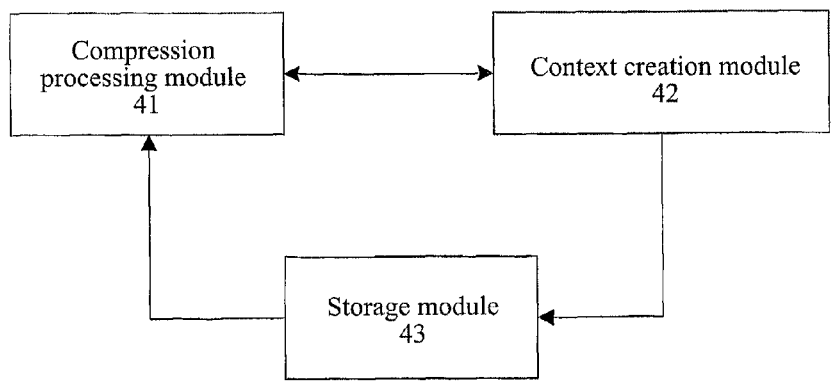
FIG. 3 is a structural diagram of the packet formats of the R-1 type compressed packet, the extension header 0, the extension header 1, and the extension header 2 acquired with the compression method in accordance with the embodiment of the present invention.
FIG. 4 is a block diagram of a device for compressing the UDP data packet whose IP version is the IPv4 in accordance with an embodiment of the present invention.

The format of the R-1 compressed packet acquired with the aforementioned compression method of the present invention is shown in FIG. 3, and on the basis of the R-1 compressed packet format shown in FIG. 1, the SN is not included in the R-1 compressed packet or its extension header. Preferably, the space of the SN field in the extension header is allocated to the IP identifier (IP-ID) field, so that more contents of the IP-ID field can be transmitted. The extension header might be the extension header 0, the extension header 1, or the extension header 2. The IP-ID field in the extension header 2 includes: the first IP-ID and the second IP-ID.

As shown in FIG. 3, the R-1 compressed packet acquired with the aforementioned compression method of the present invention comprises a 5-bit IP-ID field, the extension header 0 comprises a 6-bit IP-ID field, the extension header 1 comprises a 14-bit IP-ID field, and the extension header 2 comprises a 14-bit IP-ID2 field and a 13-bit IP-ID field. In another embodiment, the space of the original SN field in the extension header 2 might also be allocated to the first IP-ID and/or the second IP-ID with any other allocation methods. For example, the extension header 2 might also comprise the 16-bit first IP-ID field and the 11-bit second IP-ID field. It can be evidently seen that the SN is not included with the compression method of the present invention, and therefore, the compressed data amount is saved and the IP-ID field is extended so that it can carry more information contents, the compression efficiency is further improved, and the wireless bandwidth is saved.

In order to achieve the aforementioned method, the present invention also provides a device for compressing a User Datagram Protocol (UDP) data packet, applied in compression of the IPv4 UDP data packets. As shown in FIG. 4, the device comprises the compression processing module 41, the context creation module 42, and the storage module 43, wherein:

the compression processing module 41 is configured to: search the context of the UDP data packet in the storage module 43 after receiving an TPv4 UDP packet, and if the context does not exist, control the context creation module 42 to create the context of the UDP data packet, and then compress the UDP data packet according to the context;

the context creation module 42 is configured to: take the value of the IP identifier (IP-ID) field of the UDP data packet as the initial value of the serial number (SN) in the context when creating the context of the UDP packet;

the storage module 43 is configured to: store the context of the UDP data packet.

The compression processing module 41 is configured to compress the UDP data packet according to the context in a following way: if the R-1 compressed packet format is used, and the R-1 compressed packet does not have an extension header, or includes the extension header 0, the extension header 1 or the extension header 2, the R-1 compressed packet or the extension header of the R-1 compressed packet not including the SN.

The compression processing module 41 is also configured to: extend the SN field in the extension header 0, the extension header 1 and the extension header 2 as a segment of the IP-ID field, and take the extended IP-ID field to carry the information of the difference between the IP-ID and the SN for compression.

The IP-ID field in the extension header 2 includes the first IP-ID field and the second IP-ID field; the compression processing module 41 is configured to: extend a segment of the SN field or the whole SN field in the extension header 2 as a segment of the first IP-ID field, extend the left SN field as a segment of the second IP-ID field; and take the extended first IP-ID field to carry the information of the difference between the IP-ID and the SN and take the extended second IP-ID field to carry the information of the difference between the IP-ID and the SN for compression.

To achieve the aforementioned method, the present invention also provides a device for compressing a User Datagram Protocol (UDP) data packet, applied in compression of the IPv4 UDP data packets, wherein:

the compression device is configured to: when the UDP data is compressed according to the context, and if the R-1 compressed packet format is used and the R-1 compressed packet does not have an extension header or includes the extension header 0, the extension header 1 or the extension header 2, not include the SN in the R-1 compressed packet or its extension header.

The compression device is also configured to: extend the SN field in the extension header 0, the extension header 1 and the extension header 2 as a segment of the IP-ID field, and take the extended IP-ID field to carry the information of the difference between the IP-ID and the SN for compression.

The IP-ID field in the extension header 2 comprises the first IP-ID field and the second IP-ID field; said compression device is also configured to: extend a segment of the SN field or the whole SN field in the extension header 2 as a segment of the first IP-ID field, and extend the left SN field as a segment of the second IP-ID field; and take the extended first IP-ID field to carry the information of the difference value between the IP-ID and the SN and take the extended second IP-ID field to carry the information of the difference value between the second IP-ID and the SN, for compression.

Figure 5:
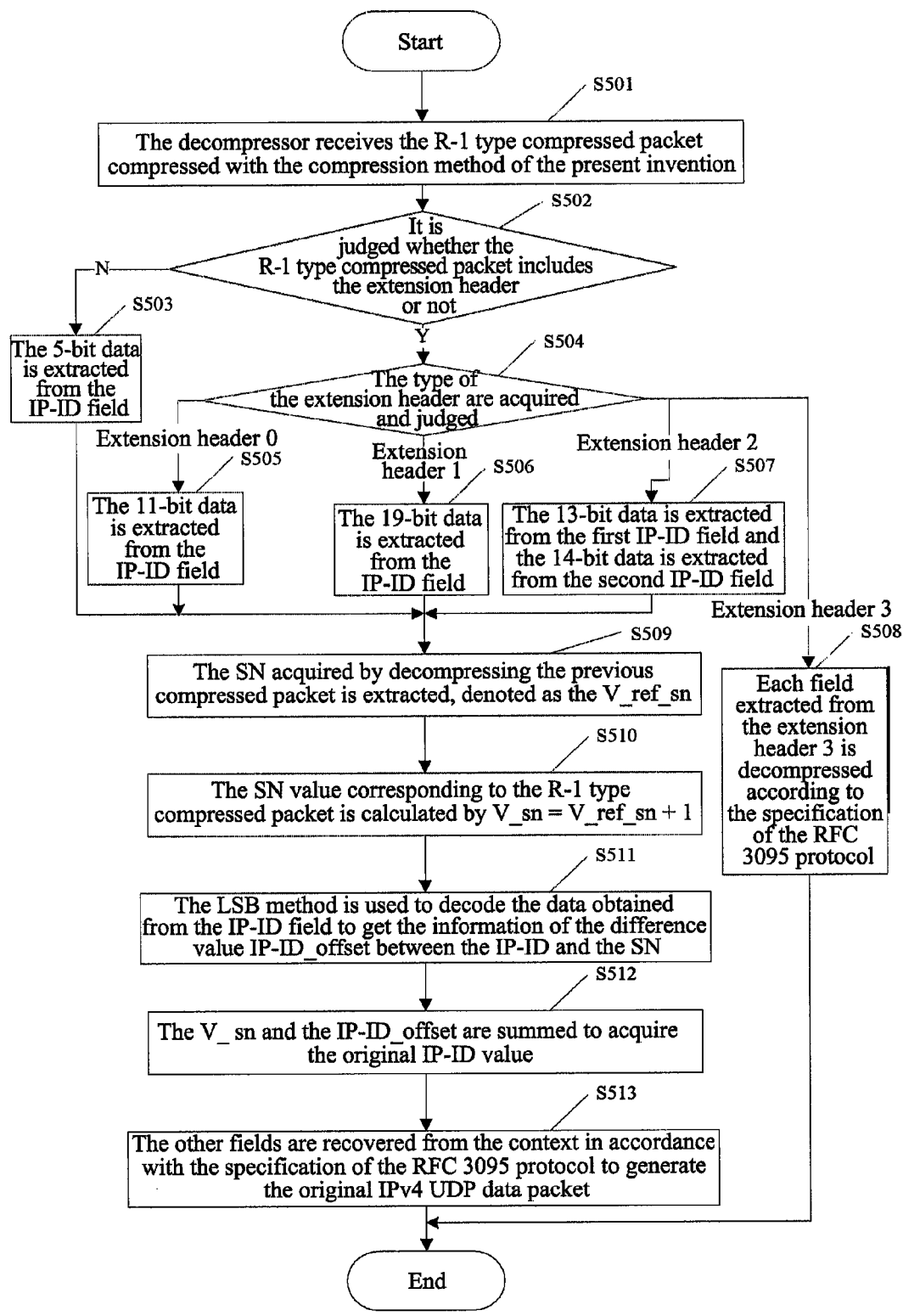
FIG. 5 is a flow chart of a method for decompressing the UDP data packet whose IP version is the IPv4 in accordance with an embodiment of the present invention.

The embodiment of the present invention also provides a decompression method used to decompress the R-1-type compressed packet acquired with the aforementioned compression method of the present invention (as shown in FIG. 3). As shown in FIG. 5, the method specifically comprises the following steps.

In step S501, the decompressor receives the R-1 type compressed packet compressed with the compression method of the present invention.

In step S502, the decompressor judges whether the R-1 type compressed packet includes the extension header or not, and if not, step S503 is performed; otherwise, step S504 is performed.

In step S503, the decompressor extracts the 5-bit data from the IP-ID field in the R-1 type compressed packet, and then proceeds to step S509.

In step S504, the decompressor acquires and judges the type of the extension header, and if the extension header is the extension header 0, proceeds to step S505, if the extension header is the extension header 1, proceeds to step S506, if the extension header is the extension header 2, proceeds to step S507, if the extension header is the extension header 3, proceeds to step S508.

In step S505, the decompressor extracts the 11-bit data from the IP-ED field in the R-1 type compressed packet, and proceeds to step S509.

In step S506, the decompressor extracts the 19-bit data from the IP-ID field in the R-1 type compressed packet, and proceeds to step S509.

In step S507, the decompressor extracts the 13-bit data from the first IP-ID field in the R-1 type compressed packet, and extracts the 14-bit data from the second IP-ID field, and proceeds to step S509.

If the extension header 2 comprises the 16-bit first IP-ID field and the 11-bit second IP-ID field, then step S507 is that the decompressor extracts the 16-bit data from the first IP-ID field and the 11-bit data from the second IP-ID field in the R-1 type compressed packet, that is, the bytes extracted by the decompressor from the first IP-ID field and the second IP-ID field in the R-1 type compressed packet are determined by the byte space occupied by the first IP-ID field and the second IP-ID field in the R-1 type compressed packet format during the compression.

In step S508, the decompressor decompresses each field in the extension header 3 according to the specification of the RFC 3095 protocol, and the procedure ends.

In step S509, the decompressor extracts the SN value acquired by decompressing the previous compressed packet, denoted as the V_ref_sn.

The previous compressed packet might be compressed with the R-1 type compression format shown in FIG. 4 according to the present invention or any other compression formats. After each compressed packet is decompressed successfully, the corresponding SN value requires storing.

The other formats with respective to the UDP compressed packet specified in the RFC 3095 protocol contains the CRC, so as to verify the correctness of the decompressed packet. In order to ensure the correctness of the compression and decompression, these types of compressed packet formats are still used to compress the data packets of the compressor according to the method described in the protocol, and the present invention does not affect the use of these packet formats.

In step S510, the decompressor calculates the SN value $V\_sn=V\_ref\_sn+1$ corresponding to the R-1 type compressed packet.

In step S511, the decompressor uses the LSB method to decode the data obtained from the IP-ID field to get the information of the difference IP-ID_offset between the IP-ID and the SN.

If it is the extension header 2, the IP-ID field includes the first IP-ID field and the second IP-ID field, step S11 specifically comprises the decompressor using the LSB method to respectively decode the data acquire from the first IP-ID field and the second IP-ID field to get the information of the difference value IP-ID_offset1 between the first IP-ID and the SN and the information of the difference value IP-ID_offset2 between the second IP-ID and the SN.

In step S512, the V_sn and the IP-ID_offset are summed to acquire the original IP-ID value.

If it is the extension header 2, the IP-ID field includes the first IP-ID field and the second IP-ID field, step S512 specifically comprises the decompressor respectively summing the SN and the difference value IP-ID_offset1 between the SN and the IP-ID acquired by decoding the first IP-ID field with the LSB method to get the original first IP-ID value, and summing the SN and the different value IP-ID_offset2 between the SN the second IP-ID acquired by decoding the second IP-ID field with the LSB method to get the original second IP-ID value.

In step S513, the other fields are recovered from the context in accordance with the specification of the RFC 3095 protocol to generate the original IPv4 UDP packet, and the procedure ends.

The other fields is in accordance with the specification of the RFC 3095 protocol, the source IP address, the destination IP address, the source port, the destination port, the IP version, the life time, the protocol field and so on are acquired from the context, and are written in according to the order of the fields in the IPv4 UDP data packet format, and finally the content of the IPv4 UDP header is recovered to achieve the object of decompression, which will not be repeated here.

Figure 6:
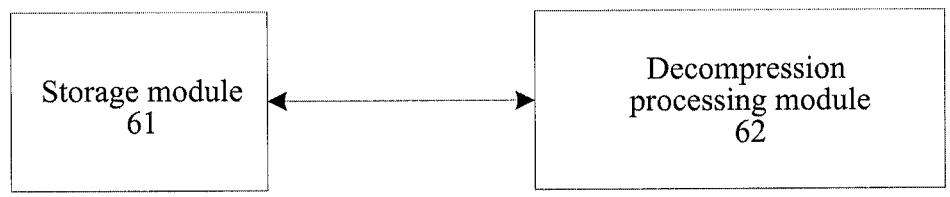
FIG. 6 is a block diagram of the device for decompressing the UDP packet whose IP version is the IPv4 in accordance with an embodiment of the present invention.

In order to achieve the aforementioned decompression method, the present invention also provides a device for decompressing a User Datagram Protocol (UDP) data packet, applied in decompression of the IPv4 UDP compressed packet. As shown in FIG. 6, the device comprises the storage module 61 and the decompression processing module 62, wherein:

said decompression processing module 62 is configured to: store the SN of a UDP compressed packet into the storage module 61 after the decompression of the UDP compressed packet is completed; after a UDP compressed packet to be decompressed is received, if the UDP compressed packet does not have an extension header, or includes the extension header 0, the extension header 1 or the extension header 2, and is compressed with any of the aforementioned compression methods in claims 2 to 7, search the SN value of the previous compressed packet of this compressed packet in the same packet flow from the storage module 61, and increment the searched SN by 1 and then take the SN as the SN value of this UDP compressed packet; and decode the IP-ID field of the UDP compressed packet to acquire the information of the difference between the IP-ID value and the SN, and sum the information of the difference and the SN to get the original IP-ID value, and thus to restore the original UDP packet;

the storage module 61 is configured to: store the SN value of the decompressed UDP packet.

Said decompression processing module 62 is also configured to: when decompressing the IP-ID field in the extension header 0, the extension header 1 or the extension field 2, the IP-ID field is the extended IP-ID field; the extended IP-ID field includes: the IP-ID field and the SN field which is extended as a segment of the IP-ID field.

In the extension header 2, the extended IP-ID field includes the extended first IP-ID field and the extended second IP-ID field; the extended first IP-ID includes the first IP-ID field and the SN field which is extended as a segment of the first IP-ID field; and the extended second IP-ID field includes the second IP-ID field and the SN field which is extended as a segment of the IP-ID field.

The above description is only the preferred embodiments of the present invention and is not intended to limit the present invention. For those skilled in the field, the present invention might have a variety of changes and modifications. Without departing from the spirit and principle of the present invention, any change, equivalent substitution and improvement should fall into the protection scope of the present invention.

INDUSTRIAL APPLICABILITY

The present invention provides methods and devices for compressing or decompressing a user datagram protocol packet, applied in compression and decompression of a data packet whose IP version is IPv4 and the type is the UDP, and the methods and devices have the following advantages. 1. The compression efficiency can be effectively improved, thus reducing the probability of sending the IR/IRDYN packets. 2. The transmission can evidently reduce 1 byte when using the R-1 type compressed packet, thus improving the compression efficiency by 50%. 3. When the R-1 type compressed packet is used and the extension hander is included, the probability of using the extension header with a large capacity is reduced. 4. After the new SN generation method is introduced in the IP-ID encoding, the efficiency is improved, and the chance of the IP-ID-offset flipping in the life time of the packet flow can be greatly reduced.

What is claimed is:

1. A method for compressing a User Datagram Protocol (UDP) data packet, comprising:
   when a compressor receives an IPv4 UDP data packet, searching a context of the UDP data packet, and if the context does not exist, creating the context of the UDP data packet, taking a value of an IP identifier (IP-ID) field of the UDP data packet as an initial value of a serial number (SN) in the context, and then compressing the UDP data packet according to the context.

2. The method of claim 1, wherein:
   the step of compressing the UDP data packet comprises: if a R-1 compressed packet format is used, and a R-1 compressed packet does not have an extension header, or the R-1 compressed packet includes an extension header 0, an extension header 1 or an extension head 2, not including the SN in the R-1 compressed packet or the extension header of the R-1 compressed packet.

3. The method of claim 2, wherein the step of compressing the UDP data packet further comprises:
   extending the IP-ID field in the extension header 0, the extension header 1 and the extension header 2, and extending an SN field as a segment of the IP-ID field; and
   taking the extended IP-ID field to carry information of a difference between an IP-ID value and the SN, and compressing the UDP data packet.

4. The method of claim 3, wherein:
   the IP-ID field in the extension header 2 includes a first IP-ID field and a second IP-ID field;
   the step of extending the SN field as the segment of the IP-ID field comprises: in the extension header 2, extending a segment of the SN field or the whole SN field as a segment of the first IP-ID field, and extending the left SN field as a segment of the second IP-ID field;
   the step of taking the extended IP-ID field to carry the information of the difference between the IP-ID and the SN comprises: taking the extended first IP-ID field to carry information of a difference between a first IP-ID value and the SN, and taking the extended second IP-ID field to carry information of a difference between a second IP-ID value and the SN.

5. A method for decompressing a User Datagram Protocol (UDP) data packet, used to decompress an IPv4 UDP data compressed packet, comprising:
   receiving a UDP compressed packet to be decompressed, if the compressed packet does not have an extension header, or includes the extension header 0, the extension header 1 or the extension header 2, and the compressed packet is compressed according to following method:
   when a compressor receives an IPv4 UDP data packet, searching a context of the UDP data packet, and if the context does not exist, creating the context of the UDP data packet, taking a value of an IP identifier (IP-ID) field of the UDP data packet as an initial value of a serial number (SN) in the context, if a R-1 compressed packet format is used, and a R-1 compressed packet does not have an extension header, or the R-1 compressed packet includes an extension header 0, an extension header 1 or an extension head 2, not including the SN in the R-1 compressed packet or the extension header of the R-1 compressed packet, incrementing a serial number (SN) of a previous compressed packet of the UDP compressed packet in a same packet flow by 1 and then take the SN as an SN of the compressed packet, decompressing an IP-ID field of the compressed packet to acquire information of a difference between an IP-ID and the SN, and summing the information of the difference and the SN to acquire an original IP-ID value, thereby restoring an original UDP data packet.

6. The method of claim 5, wherein:
the step of decompressing the IP-ID field of said compressed packet comprises: decompressing the IP-ID field in the extension header 0, the extension header 1 and the extension header 2; wherein,
the IP-ID field in the extension header 0, the extension header 1 and the extension header 2 is the extended IP-ID field, and the extended IP-ID field includes: the IP-ID field and an SN field which is extended as a segment of the IP-ID field.

7. The method of claim 6, wherein:
in the extension header 2, the extended IP-ID field includes an extended first IP-ID field and an extended second IP-ID field; wherein,
the extended first IP-ID field includes a first IP-ID field and the SN field which is extended as a segment of the first IP-ID field; and the extended second IP-ID field includes a second IP-ID field and the SN field which is extended as a segment of the second IP-ID field.

8. A device for compressing a User Datagram Protocol (UDP) data packet, comprising a processor and a storage device, wherein the storage device stores a compression processing module, a context creation module, and a storage module, wherein the device is used to compress an IPv4 UDP data packet, wherein:
the compression processing module is configured to: search a context of the UDP data packet in the storage module after receiving the IPv4 UDP data packet, if the context does not exist, instruct the context creation module to create the context of the UDP data packet, and compress the UDP data packet according to the context;
the context creation module is configured to: receive an instruction from said compression processing module, then take a value of an IP identifier (IP-ID) field of the UDP data packet as an initial value of a serial number (SN) in the context, create the context of the UDP data packet and send the context of the UDP data packet to said storage module;
said storage module is configured to: store the context of the UDP data packet.

9. The device of claim 8, wherein:
the compression processing module is configured to compress the UDP data packet as follows: if a R-1 compressed packet format is used, and the R-1 compressed packet does not have an extension header, or the R-1 compressed packet includes an extension header 0, an extension header 1 or an extension header 2, not including an SN in the R-1 compressed packet or the extension header of the R-1 compressed packet.

10. The device of claim 9, wherein:
said compression processing module is also configured to compress the UDP data packet as follows: extending an SN field in the extension header 0, the extension header 1 and the extension header 2 as a segment of the IP-ID field, and taking the extended IP-ID field to carry information of a difference between an IP-ID and the SN, and compressing the UDP data packet.

11. The device of claim 10, wherein:
the IP-ID field in the extension header 2 includes a first IP-ID field and a second IP-ID field;
the compression processing module is configured to extend the SN field as the segment of the IP-ID field as follows: extending a segment of the SN field or the whole SN field in the extension header 2 as a segment of the first IP-ID field, and extending the left SN field as a segment of the second IP-ID field; and
the compression processing module is configured to take the extended IP-ID field to carry the information of the difference between the IP-ID and the SN as follows: taking the extended first IP-ID field to carry information of a difference between a first IP-ID and the SN, and taking the extended second IP-ID field to carry information of a difference between a second IP-ID and the SN.

12. A device for decompressing a User Datagram Protocol (UDP) data packet, comprising a processor and a storage device, wherein the storage device stores a storage module and a decompression processing module, wherein the device is used to decompress an IPv4 UDP compressed packet, wherein:
said decompression processing module is configured to: receive a UDP compressed packet to be decompressed, if the compressed packet does not have an extension header, or includes an extension header 0, an extension header 1 or an extension header 2, and is compressed, when a compressor receives an IPv4 UDP data packet, searching a context of the UDP data packet, and if the context does not exist, creating the context of the UDP data packet, taking a value of an IP identifier (IP-ID) field of the UDP data packet as an initial value of a serial number (SN) in the context, and then compressing the UDP data packet according to the context, wherein compressing the UDP data packet comprises, if a R-1 compressed packet format is used, and a R-1 compressed packet does not have an extension header, or the R-1 compressed packet includes an extension header 0, an extension header 1 or an extension head 2, not including the SN in the R-1 compressed packet or the extension header of the R-1 compressed packet;
search an SN of a previous compressed packet of this compressed packet in a same packet flow in the storage module, and increment the searched SN by 1 then take the SN as an SN of this compressed packet; and decompress an IP-ID field of the compressed packet to acquire information of a difference between an IP-ID and the SN, and sum the information of the difference and the SN to get an original IP-ID value, thus to restore an original UDP data packet; and
the storage module is configured to: store the SN of the decompressed UDP data packet.

13. The device of claim 12, wherein:
said decompression processing module is configured to decompress the IP-ID field as follows: decompressing the IP-ID field in the extension header 0, the extension header 1 or the extension field 2; wherein,
the IP-ID field is the extended IP-ID field;
the extended IP-ID field includes: the IP-ID field and a SN field which is extended as a segment of the IP-ID field.

14. The device of claim 13, wherein:
in the extension header 2, the extended IP-ID field include an extended first IP-ID field and an extended second IP-ID field; the extended first IP-ID field includes a first IP-ID field and an SN field which is extended as a segment of the first IP-ID field; and the extended second IP-ID field includes a second IP-ID field and an SN field which is extended as a segment of the second IP-ID field.

* * * * *

UNITED STATES PATENT AND TRADEMARK OFFICE
CERTIFICATE OF CORRECTION

| | | |
|---|---|---|
| PATENT NO. | : 8,817,821 B2 | Page 1 of 1 |
| APPLICATION NO. | : 13/499471 | |
| DATED | : August 26, 2014 | |
| INVENTOR(S) | : Xuehong Shi et al. | |

It is certified that error appears in the above-identified patent and that said Letters Patent is hereby corrected as shown below:

In the Claims,

Column 14, Line 35, Claim 12:

After "or an extension"
Delete "head" and
Insert -- header --.

Signed and Sealed this
Thirtieth Day of December, 2014

Michelle K. Lee
*Deputy Director of the United States Patent and Trademark Office*